United States Patent Office 3,415,625
Patented Dec. 10, 1968

3,415,625
PREPARATION OF HEXAGONAL BORON NITRIDE
Albert Babl and Heinz Geng, Waldshut, Baden, Germany, assignors to Lonza-Werke G.m.b.H., Weil am Rhine, Germany
No Drawing. Filed Apr. 19, 1967, Ser. No. 631,922
Claims priority, application Switzerland, Feb. 3, 1967, 1,642/67
4 Claims. (Cl. 23—204)

ABSTRACT OF THE DISCLOSURE

Hexagonal boron nitride is prepared by heating a mixture of an oxygen-containing boron compound and an organic nitrogen-containing compound in a reactor whose walls have a coating of preformed hexagonal boron nitride.

---

This invention relates to the production of hexagonal boron nitride.

Hexagonal boron nitride is a difficultly fusible refractory material having particular electric and lubricating properties and received increasing interest from industry.

It is known to prepare boron nitride from oxygen-containing boron compounds and ammonia at temperatures of 700 to 1100° C. in the presence of an inert high melting highly voluminous diluent, such as calcium phosphate. The diluting agent must then be washed out of the reaction mixture with an acid. The obtained boron nitride is unstable and its lattice arangement is not clearly defined (German Patent 1,153,731).

Patent No. 3,189,412 discloses a process to prepare boron nitride by passing nitrogen or ammonia or another nitrogen-providing gas at 1200 to 1600° C. over a mixture comprising boric oxide, boric acid, or another boric oxide providing substance, carbon, and a catalyst, treating the reaction mixture with dilute mineral acid, and separating the boron nitride. This process in which the preferred catalyst is $MnO_2$ produces high yields, particularly at temperatures of 1400° C. However, the obtained boron nitride is contaminated with the carbon of the starting mixture and constitutes an X-ray amorphous product which must be converted to crystalline hexagonal boron nitride in an additional step.

It is a principal object of this invention to provide a a single step process for the production of hexagonal boron nitride.

Other objects and advantages will be apparent from a consideration of the specification and claims.

In accordance with the invention, an oxygen-containing boron compound is mixed with an organic-nitrogen-containing compound; the mixture is dried at a temperature of 110 to 350° C. and then heated in a reactor whose walls are coated with preformed hexagonal boron nitride, to a temperature of 1600 to 2100° C., preferably 1700 to 2000° C., maintained at the final temperature for 5 to 90 minutes. The cooled reaction product is comminuted and subjected to a treatment with water. Finally, the boron nitride filtered after the water treatment is dried.

Preferably, the reaction is carried out in reactors which have already repeatedly been used for the same purpose and contain, therefore, on their walls or on the bottoms a sufficient amount of the hexagonal boron nitride.

Generally, it is sufficient to have hexagonal boron nitride prepared by some catalytic procedure once or twice in a reactor to obtain walls which have and maintain the desired autocatalytic reaction. After such initiating addition of catalyst, the catalyst can be omitted. For this wall forming of the reactor to be used, we prefer to employ as catalysts alkaline earth metal nitrides, particularly calcium or magnesium nitride, in amounts of .2 to 5 percent by weight, calculated on the mixture to be reacted, in a reaction disclosed and claimed in our copending application Ser. No. 621,799, filed Mar. 9, 1967.

The preformed hexagonal boron nitride has to be on the walls of the reactor. An admixture of such hexagonal boron nitride to the starting mixture is not effective; no noticeable formation of additional hexagonal boron nitride could be observed when the mixture was heated in reactors not satisfying the wall condition recited hereinabove.

Suitable oxygen-containing boron compounds are boric acid, boron oxide, and boric oxide providing substances. We prefer to use boric acid ($H_3BO_3$). Suitable organic nitrogen-containing compounds are particularly melamine, urea, dicyanodiamide, as they have been used heretofore in the production of turbostratic boron nitride (see e.g. British Patent 951,280).

The starting materials are mixed in the dry state in a proportion of 1 mole of the boron compound, calculated as $B_2O_3$, to 2 to 6, preferably 4 to 5, gram atoms of nitrogen of the employed organic nitrogen-containing compound. The starting mixture is used in powdery or compacted form, whereby the grain size is not critical.

Subsequently, the mixture is dried at temperatures of 110 to 350° C., preferably 150 to 250° C. During drying, small losses of nitrogen take place.

The drying operation can be carried out in air or in a nitrogen or ammonia atmosphere. The drying time depends on the drying temperature and also on whether the drying step is performed in a static atmosphere or with circulating air or gas. In the latter case, considerably shortened times may be used. In a static atmosphere, about four hours are sufficient for drying at a temperature of 210° C., and ten hours at 150° C.

The dried material is then crushed or ground whereby conventional mills like roller mills, cross beater mills, rolling discs and the like can be employed.

The reaction mixture is heated to the reaction temperature preferably within 10 to 15 minutes though slower heating rates do not do any harm. A preliminary reaction takes place during the heating-up period. The crystalline boron nitride forms at reaction temperature. The period for which the reaction mixture must be kept at reaction temperature, depends on the height of the temperature. The higher the reaction temperature, the lower the reaction times. At low temperatures, e.g. at 1600° C., the mixture should be maintained at reaction temperature for 60 to 90 minutes; at high temperatures, e.g. at 1900 to 2000° C., 5 to 10 minutes are sufficient.

Heating is carried out in an inert gas atmosphere, e.g. nitrogen or argon, preferably in a gentle current of nitrogen. In this way, the gases and vapors developed in the reaction such as water vapor, $CO_2$, $NH_3$, as well as the substances which are volatile at reaction temperature, are removed from the reaction space.

The process of the invention can be carried out as a batch process or continuously, whereby the reaction mixture is introduced as a loose powder or a compacted mass into the reaction vessel, which is preferably of graphite. When not compressed material is used, it is advantageous to cover the reaction vessel with a perforated lid.

The reaction product is cooled and comminuted, and the ground product is subjected to a water treatment, preferably with water having a temperature of 90 to 95° C. This step is carried out preferably with stirring for 30 to 60 minutes. The obtained sludge is filtered, and the filtered boron nitride is dried at a temperature of about 105° C. If necessary or desired, the product is then again comminuted. The weight loss in the water treatment is about 0.5 to 2 percent. X-ray determination shows the produced boron nitride to be a very well crystallized hexagonal boron nitride.

The following example is given to illustrate the invention.

EXAMPLE 1

495 g. of boric acid ($H_3BO_3$) and 336 g. of dicyanodiamide were mixed as powders in the dry state and were then dried in a porcelain dish in a drying cabinet for 4 hours at a temperature of 210° C. The mixture sintered to a porous cake and showed a weight loss of 24.4%, caused by the conversion of boric acid ($H_3BO_3$) to metaboric acid ($HBO_2$).

The caked mixture was crushed and ground to a fineness of 0.2 mm.

158 g. of said mixture were pressed under a pressure of 1000 kg./cm.$^2$ to cylindrical shapes (2.5 cm. diameter, 10 mm. length) and placed into a graphite crucible whose inner wall had a coating of well crystallized hexagonal boron nitride.

Another similar crucible was filled with a loose uncompacted charge of 200 g. of the dried mixture.

Both crucibles were provided with covers, heated in a nitrogen atmosphere within 40 minutes to 1800° C., and maintained for 15 minutes at said temperature.

After cooling and washing, the crushed compacted reaction mixture yielded 39.4 g., the loose mixture 40.8 g. of a well crystallized hexagonal boron nitride. The yields therefore, were 82.6 and 67.6 percent, respectively, calculated on boric acid.

We claim:

1. A process for producing hexagonal boron nitride which comprises mixing an oxygen-containing boron compound with an organic nitrogen-containing compound, drying the mixture at a temperature of 110 to 350° C., heating the mixture in an inert atmosphere in a reaction zone defined by an enclosure at least partially coated with hexagonal boron nitride to a temperature in the range of 1600 to 2100° C., and maintaining the mixture at said temperature for a period of 5 to 90 minutes.

2. The process as claimed in claim 1 comprising compressing the reaction mixture before it is heated.

3. The process as claimed in claim 1 wherein said oxygen-containing boron compound is boric acid.

4. The process as claimed in claim 1 wherein said organic nitrogen-containing compound is dicyanodiamide.

References Cited

UNITED STATES PATENTS

| | | | |
|---|---|---|---|
| 2,808,314 | 10/1957 | Taylor | 23—191 |
| 2,823,102 | 2/1958 | Selker at al. | 148—1.6 |
| 3,240,563 | 3/1966 | Mercuri et al. | 23—204 |
| 3,241,918 | 3/1966 | Lenihan et al. | 23—191 |

OSCAR R. VERTIZ, *Primary Examiner.*

H. S. MILLER, *Assistant Examiner.*

U.S. Cl. X.R.

23—191